Aug. 27, 1963    G. K. NEWELL    3,101,814
SLACK ADJUSTING MECHANISM FOR RAILWAY CAR BRAKE APPARATUS
Filed Dec. 20, 1961    4 Sheets-Sheet 3

INVENTOR.
George K. Newell
BY
*A. A. Steinmiller*
Attorney

Aug. 27, 1963   G. K. NEWELL   3,101,814
SLACK ADJUSTING MECHANISM FOR RAILWAY CAR BRAKE APPARATUS
Filed Dec. 20, 1961   4 Sheets-Sheet 4

*Fig. 4*

INVENTOR.
George K. Newell
BY
*G. G. Steinmiller*
Attorney ated Aug. 27, 1963

3,101,814
SLACK ADJUSTING MECHANISM FOR RAILWAY
CAR BRAKE APPARATUS
George K. Newell, Penn Township, Westmoreland County, Pa., assignor to Westinghouse Air Brake Company, Wilmerding, Pa., a corporation of Pennsylvania
Filed Dec. 20, 1961, Ser. No. 160,736
10 Claims. (Cl. 188—203)

This invention relates to automatic slack adjusting mechanism for railway brake apparatus and more particularly to a slack adjusting mechanism for a brake apparatus or rigging, for railway car trucks, of the type described and claimed in United States Patent No. 2,958,398 of George K. Newell, in which brake rigging the two parallel-extending brake beams of each car truck are operated to apply and release the brake shoes to and from the car wheel treads by means of one or more brake cylinders secured to the brake beams and each provided with a piston having a piston rod that is operatively connected to the other brake beam.

The brake apparatus or rigging, shown in the above-mentioned patent, may be employed on railway cars of weights varying over a wide range from relatively light weights to very heavy weights. Moreover, while brake shoes of the composition type are preferably used with this type of brake rigging, brake shoes of the cast iron type may also be used. When composition brake shoes are employed on lightweight railway cars using the brake rigging described in the Newell patent, slack adjusting mechanism is not required because of the high coefficient of friction of these composition brake shoes and the relatively small diameter brake cylinders required. In such case, the brake cylinder volume to which fluid under pressure is supplied from the usual auxiliary and emergency reservoirs by, such as the well-known "AB" control valve device, when a brake application is made, is not great, and therefore there is no appreciable change in the equalization pressure resulting from connecting the auxiliary or both the auxiliary and emergency reservoirs to the brake cylinder during a brake application. Accordingly, in such installataions a slack adjusted mechanism is not required since the increase in brake cylinder piston travel due to brake shoe wear is slight and normally does not exceed 1⅝".

When composition brake shoes and the brake rigging described in the Newell patent are used on heavyweight railway cars, brake cylinders of larger diameter and therefore of increased weight are necessary to provide the required braking force for adequately braking these cars. As illustrated in the Newell patent, the brake cylinders overhang or extend to one side of the brake beams to which they are secured. Hence, any increase in the size and therefore the weight of these brake cylinders increases both the bending and torsional stresses in the brake beam to which they are secured. Since the torsional stresses in the brake beam are proportional to the overhang or length of the brake cylinder, it is desirable that the overhang of the brake cylinders be minimized. If slack adjuster mechanism is provided for each brake cylinder, it is possible to employ a shorter length brake cylinder compared to that required where slack adjusting mechanism is not employed, for the reason that the slack adjuster mechanism prevents the piston travel from exceeding a certain maximum as the brake shoes wear away.

In installations where the type of brake rigging described in the aforesaid patent is used with cast iron brake shoes on railway cars, light or heavy, the problem of brake beam stresses is further aggravated as a result of the larger diameter brake cylinders which are required to provide the larger braking forces necessary because of the lower friction coefficient of the cast iron shoes. Therefore, a slack adjusting mechanism is especially desirable where cast iron brake shoes are used with the Newell type of brake rigging since it enables the use of a shorter and therefore a lighter brake cylinder than would be required if no slack adjusting mechanism were used.

The trucks of railway cars are constructed with a considerable amount of inherent flexibility which is provided by the various members that make up the truck. The bolster for a truck of a railway car has a plurality of lugs by which the bolster is retained and guided with respect to the side frame of the truck, there being normally a certain amount of clearance between the lugs and side frames. Likewise, there is a certain amount of clearance between the journal boxes on the ends of the side frames and the axle journals.

Accordingly, this clearance between the various members that make up the trucks of a railway car provides for an appreciable amount of "weaving" or departure from the normal rectangular configuration of the truck, this "weaving" having been found by many years of experience to be essential in maintaining the stability of the truck and its ability to stay or remain on the rails when traveling at high speeds, and to facilitate the negotiation of curves, crossovers and swtiches in railway tracks. Furthermore, it has been found from experience that the prevention of excessive wear of the flange and tread of the truck wheels depend, in a large measure, upon the provision of a certain amount of flexibility in the truck.

It is, therefore, important that, when a brake apparatus or rigging is applied to or installed upon the trucks of a railway car, this inherent and necessary flexibility of the trucks be interfered with or curtailed to the least possible extent.

The above "weaving" action requires that there be a limited universal angular movement of the piston rod of each brake cylinder used in the brake rigging described in the heretofore mentioned Newell patent, this limited universal angular movement hereinafter being referred to as "bailing action" of the piston rod. Consequently, this "bailing action" of the piston rod introduces special mechanical problems into this type of brake rigging or apparatus for the reason that the amount of travel of a brake cylinder piston and therefore the amount of overtravel of the piston as a result of brake shoe wear cannot be compensated for by existing froms of slack adjusting mechanism without some modification to provide for bailing action of the piston rod.

Accordingly, it is the purpose of this invention to provide a slack adjusting mechanism so constructed and designed as to be applicable to a brake rigging or apparatus of the type described in the above-mentioned Newell patent so that it is operable upon the travel of the brake cylinder piston and the corresponding piston rod with respect to a fixed part of the brake cylinder exceeding a chosen value notwithstanding "bailing action" of the piston rod.

The present invention comprises slack adjusting means for railway brake rigging of the type in which reactive forces are exerted in opposite directions on two substantially parallel brake-shoe-carrying brake beams through a pair of two-member piston rods each having a screw-threaded connection between the respective two members thereof and being yieldingly connected respectively at its respective opposite ends to the two brake beams to provide "bailing action," the piston rods being effective to transmit therethrough the reactive forces resulting from fluid under pressure acting in opposite directions on a pair of brake cylinder pistons and their respective brake cylinders secured to the brake means. Each of the two brake cylinders has a hollow actuator sleeve carried coaxially on one of the members of the piston rod and yieldably connected to a stationary part of the respective brake cylinder so as to have limited universal movement with respect thereto. The interior of the hollow actuator sleeve is provided adjacent one end with a set of ratchet teeth which mesh with a set of teeth having twice the radial depth formed on one side of a hollow pawl sleeve slidably mounted in the hollow actuator sleeve and having a second set of ratchet teeth on the other side. A trigger sleeve is slidably mounted in and splined to the hollow actuator sleeve on the side of the hollow pawl sleeve having the teeth of greater depth. The trigger sleeve is provided with ratchet teeth on the end thereof adjacent the pawl sleeve which teeth are arcuately offset from the teeth of greater depth on the pawl sleeve. The trigger sleeve is movable by one member of the piston rod upon the travel of the brake cylinder piston exceeding a chosen value as a result of brake shoe wear, whereupon the ratchet teeth on the trigger sleeve are effective upon the ratchet teeth on the pawl sleeve to cause rotation thereof until the two sets of ratchet teeth are fully engaged. This rotation is transmitted through a ratchet sleeve to the second member of the piston rod to rotate this member with respect to the first member thereof to lengthen the piston rod to compensate for brake shoe wear in any angular position of the piston rod.

In the accompanying drawing:

FIGS. 2A and 2B, taken together, constitute a cross-sectional view, on an enlarged scale, taken along the line 2—2 of FIG. 1, and looking in the direction of the arrows, showing the details of construction of the brake cylinder and the connections providing limited universal angular movement between the opposite ends of the piston rod of the brake cylinder with, respectively, the brake cylinder carried by one brake beam and the other brake beam.

*Description*

Figure 1:
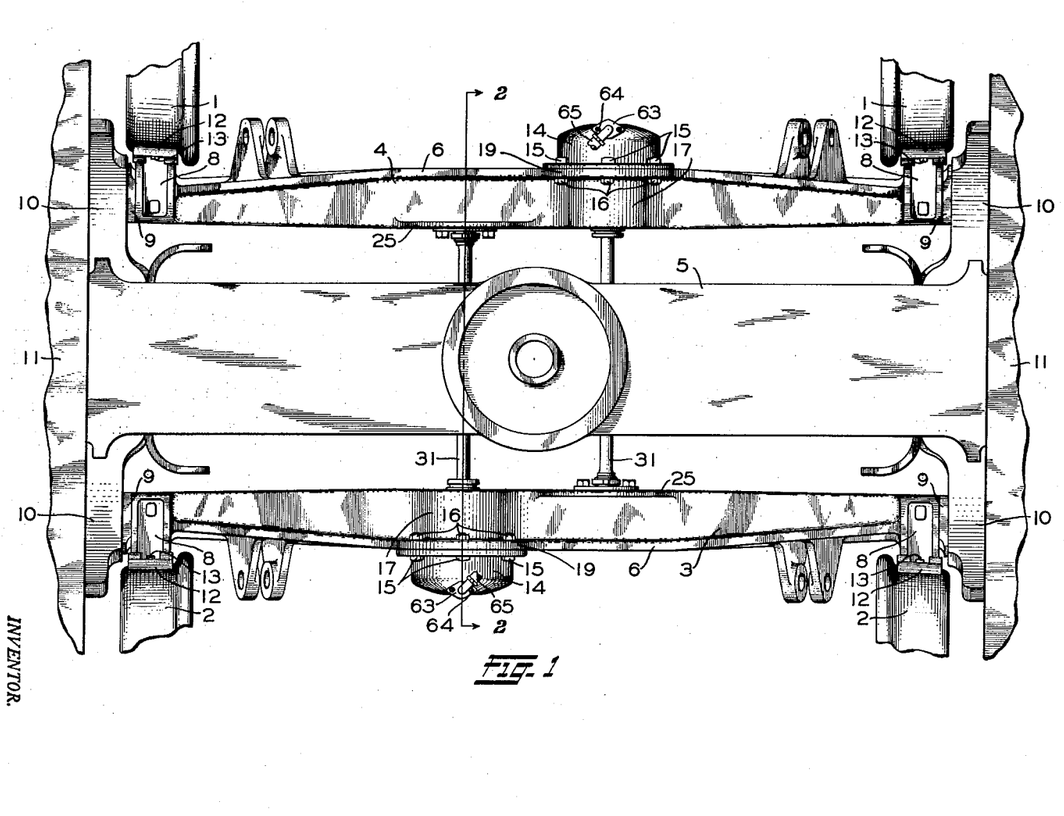
FIG. 1 is a plan view of a brake rigging for a four-wheel (that is, two-axle) car truck, which rigging embodies a slack adjusting mechanism constructed and designed in accordance with the present invention.

Referring to FIG. 1 of the drawings, reference numerals 1 and 2 designate, respectively, the wheels secured to opposite ends of each of two axles (not shown) of a two-axle four-wheel railway car truck.

The brake rigging shown in FIG. 1 comprises a pair of cast brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in a manner hereinafter described.

The brake beams 3 and 4 each, in cross section, have generally the shape of a U-channel with the outer ends of the flanges thereof curved through an angle of substantially 90° to form upper and lower ribs, respectively, the upper rib being designated and shown in FIG. 1 by the reference numeral 6. The brake beams 3 and 4 are constructed, as hereinafter described and shown in FIG. 2A, to provide integral therewith a non-pressure head 7 of a brake cylinder, which non-pressure head 7 is cast integral with each of the respective brake beams.

As shown in FIG. 1, a brake head 8 is cast integral with each of the brake beams 3 and 4 at each end thereof adjacent to and on the inboard side of one of a pair of guide feet 9 which are also cast integral with each of the respective brake beams at the opposite ends thereof. Each guide foot 9 is a flat generally L-shaped member, the outer leg of which is slidably supported in a groove in a wear plate and guide member 10 which is secured to a truck side frame 11. The wear plate and guide members and the guide feet serve to support the brake beams 3 and 4 at the proper height above the rails (that is, somewhat below the horizontal diameter of the wheels), the grooves in the wear plate and guide members 10 being at a slight angle to the horizontal to permit bodily movement of the brake beam in the direction radially of the associated wheels when a brake application is made.

Each brake head carries either a "composition" type or a "cast iron" type of brake shoe 12 for contact with the tread of an associated wheel. In the "composition" type of brake shoe, the material constituting the brake block has a relatively high and uniform friction characteristic as compared to the relatively low and non-uniform characteristic of the "cast iron" type of brake shoe having a brake block of cast iron. In customary manner, each shoe 12 has a backing plate provided with a key bridge to receive a key 13 for removably locking the shoe to the brake head 8.

Figure 2A:
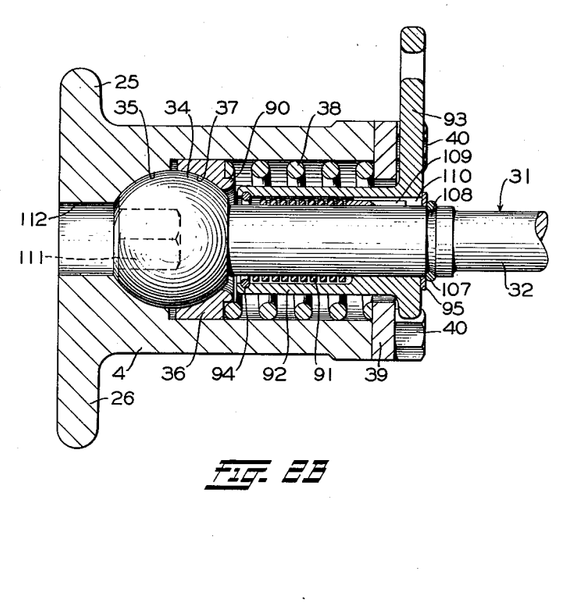

The brake shoes 12 are operated into and out of contact with the associated wheels 1, 2 by means of a pair of fluid pressure motors or brake cylinders 14 which, as shown in FIG. 2A, are respectively secured to the brake beams 3 and 4 by a plurality of bolts 15 and nuts 16, two of each being shown in FIG. 2A. The brake cylinders 14 are symmetrically located on opposite sides of the central longitudinal axis of the car truck, respectively intermediate the center and one end of the respective brake beams 3 and 4. Since each brake beam 3 and 4 and its one brake cylinder 14 bolted thereto is identical, only the brake beam 3 will be described in detail.

As can be seen from FIGS. 1 and 2A, the non-pressure head 7 is cast integral with the U-shaped channel constituting the brake beam 3 by having the upper and lower flanges thereof elongated or expanded, as indicated at 17 and 18 in FIG. 2A. Likewise, the corresponding ribs 6 are elongated or expanded to form bolting flanges 19 and 20 that extend in opposite directions to which the brake cylinder 14 is secured by the bolts 15 which extend through bores 21 and 22, respectively, in corresponding bolting flanges 23 and 24 formed, as shown in FIG. 2A, at the left-hand end of the brake cylinder 14 and adapted to abut, respectively, the bolting flanges 19 and 20 in which are provided corresponding bores coaxial with the bores 21 and 22.

Also, as shown in FIGS. 1 and 2B, on the web side of the U-channel constituting the brake beams 3 and 4 and extending outwardly from the outside faces of the upper and lower flanges thereof and in spaced-apart relation to the respective expanded flanges 17 and 18 of the U-channels are a second pair of oppositely extending longitudinal ribs 25 and 26, both being shown in FIG. 2B but only the rib 25 appearing in FIG. 1. The inside face of each of the ribs 25 and 26 is spaced from the corresponding rib 6 a distance that is substantially equal to the width of the flange portions 17 and 18 less the thickness or width of the corresponding ribs. These ribs 25 and 26 also extend a chosen distance along the outside edge of the respective upper and lower flanges of the U-channel on one side of the brake cylinder 14.

As shown in FIG. 2A, the body of the brake cylinder 14 has a bore in which a piston 27 is slidably operable. A hollow rod 28 secured coaxially to the piston 27 extends slidably into a central opening or bore 29 in the non-pressure head 7. The piston 27 is provided with a recess 30 coaxial with the piston. The recess 30 is adapted to receive one end of a piston rod 31. This piston rod 31 comprises two parts, one of which is a screw member 32 and the other of which is an internally threaded rotative sleeve member 33 in which one end of the screw member 32 is received. The opposite end of the screw member 32, as shown in FIG. 2B, is provided with a spherical or ball-like end 34 that is received within a cavity 35 formed in the brake beam 4 in the form of a segment of a sphere. The cavity 35 forms a seating surface for the spherical ball-like end 34 of the pitson rod 31 thereby providing for limited universal angular movement of the piston rod 31 with respect to the brake beam 4. Disposed between the upper and lower flanges of the U-channel constituting the brake beam 4 and in coaxial surrounding relation to the screw-threaded member 32 is a bushing 36 which also is provided with a cavity 37 in the form of a sphere, the two cavities 35 and 37 cooperating to form a seating surface for the spherical or ball-like end 34 so that the ball-like end 34 and the brake beam 4 have a ball and socket connection therebetween which provides for limited angular movement of the screw member 32 of the piston rod 31 with respect to the brake beam 4.

Disposed about the screw-threaded member 32 of the piston rod 31 is a heavy spring 38 that is interposed between the bushing 36 and a retaining plate 39 that is secured to the outer ends of the opposite flanges of the brake beam 4 by a plurality of cap screws 40, two of which partly appear in FIG. 2B.

As shown in FIG. 2A, the right-hand end of screw-threaded member 32 has screw-threaded engagement with the sleeve member 33 of the piston rod 31. The right-hand end of the sleeve member 33 is provided with a knob 41 having a spherical outer surface that is disposed in the recess 30 in the piston 27 and rests against a wear plate 42 of some suitable hard material, the wear plate being cast integral with the piston 27.

Disposed on the left-hand side of the knob 41 of the sleeve member 33 is a thrust bearing comprising a pair of bearing races 43 and 44 between which are disposed a plurality of ball bearings 45. Resting against the left-hand side of the ball bearing race 43 is a spherical seated washer 46 which is disposed in coaxial surrounding relation to the sleeve member 33. Also disposed in surrounding relation to the sleeve member 33 is a spherical seat member 47 that cooperates with the spherical seated washer 46 to provide a ball and socket joint having limited universal angular movement. Adjacent the spherical seat member 47 and disposed coaxially about the sleeve member 33 is an annular cushioning element 48 which is constructed of rubber or some other suitable material. This cushioning element 48 is arranged between the spherical seat member 47 and a hollow plate member 49 disposed coaxially about the sleeve member 33 and retained against the cushioning element 48 by a snap ring 50 that is inserted in a groove 51 formed in the piston 27.

The hollow rod 28 has on its right-hand end an inturned flange 52 against which rests one end of a brake cylinder release spring 53 which is a lighter spring than the spring 38. The opposite end of the spring 53 rests against an outturned flange 55 formed on the left-hand end of a spring seat 56, the outturned flange 55 in turn resting against an inturned flange 57 formed on the non-pressure head 7 opposite the flanges 19 and 20.

Formed on a packing cup 58 secured to the piston 27 are a plurality of lugs 59 which, when the piston 27 occupies the position in which it is shown in FIG. 2A, contact the end wall or pressure head of the cylinder 14 to form between the piston 27 and the closed end of the cylinder 14 a pressure chamber 60 to which fluid under pressure may be supplied through a passageway 61 formed in the brake cylinder 14. As shown in FIG. 2A, the passageway 61 extends upward to a flat face 62 formed on the brake cylinder 14. A flange fitting 63 is secured to the face 62 by a pair of cap screws 64. The flange fitting 63 receives one end of a hose 65 the opposite end of which is connected to the brake cylinder pipe leading from the usual brake controlling valve device (not shown) of the air brake system on railway freight cars. Fluid under pressure supplied to the pressure chamber 60 through the hose 65, flange fitting 63 and passageway 61 causes movement of the cylinder 14 and the brake beam 3 in one direction and the piston 27, piston rod 31 and brake beam 4 in the opposite direction to effect braking contact of the brake shoes 12, carried by the brake beams 3 and 4, with the treads of their respectively associated wheels.

It is apparent from FIG. 1 that, as the braking surface of the brake shoes 12 wear away, the travel of the piston rods 31 and the pistons 27 will increase progressively with successive applications of the brakes. Therefore, in order to maintain the same travel distance for the piston rods 31 and their respective pistons 27, upon each application of the brakes as the brake shoes 12 wear away, each brake cylinder 14 is provided with a slack take-up or adjusting mechanism which will now be described in detail.

The slack adjusting mechanism of the brake cylinder 14 shown in FIG. 2A comprises, in addition to the screw-threaded member 32, and the internally threaded sleeve member 33 which has screw-threaded engagement with the threaded portion of the screw member 32, a hollow actuator sleeve 66, a hollow trigger sleeve 67, a pawl sleeve 68, a spring 69, and a ratchet sleeve 70 which is secured to the sleeve member 33 by a plurality of pins 71.

Figure 3:
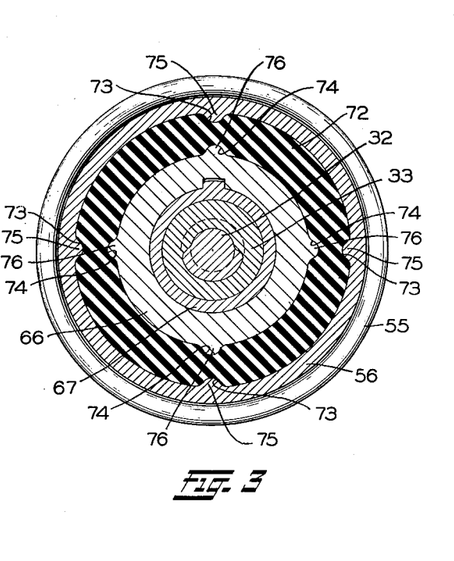
FIG. 3 is a vertical cross-sectional view, taken along the line 3—3 of FIG. 2A and looking in the direction of the arrows, showing additional structural details.

The hollow actuator sleeve 66 is coaxially carried in surrounding relation to the sleeve member 33 by means of a resilient annulus 72 constructed of some yieldable material such as rubber and provided with two pairs of external and two pairs of internal diametrically opposite longitudinally extending slots 73 and 74, respectively, in which slots 73 and 74 are received corresponding lugs 75 and 76 formed respectively on the interior of the spring seat 56 and on the exterior of the actuator sleeve 66. As shown illustratively in FIG. 3, the slots 73 and 74 are spaced approximately 90° apart.

Figure 4:
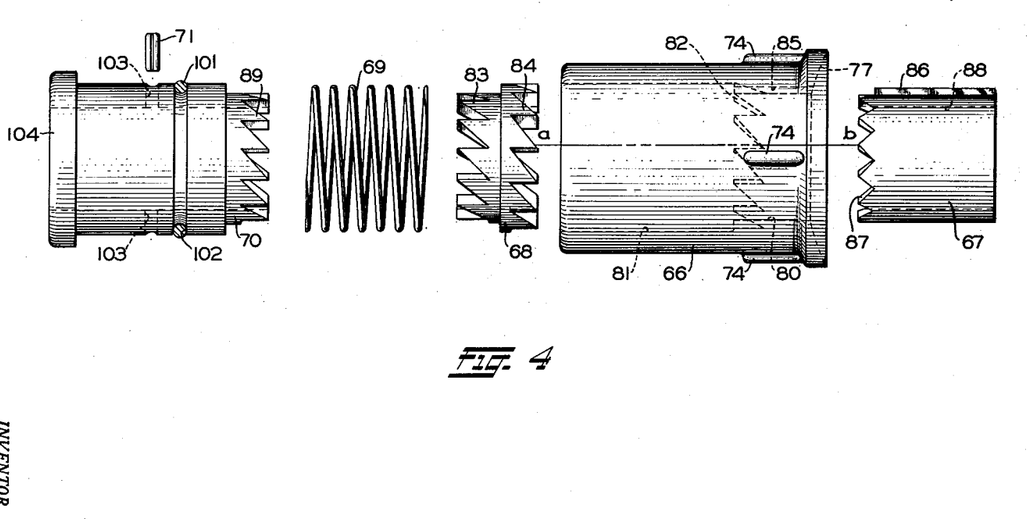
FIG. 4 is an exploded view of the parts of the slack adjusting mechanism shown in FIG. 2A.
Figure 8A:
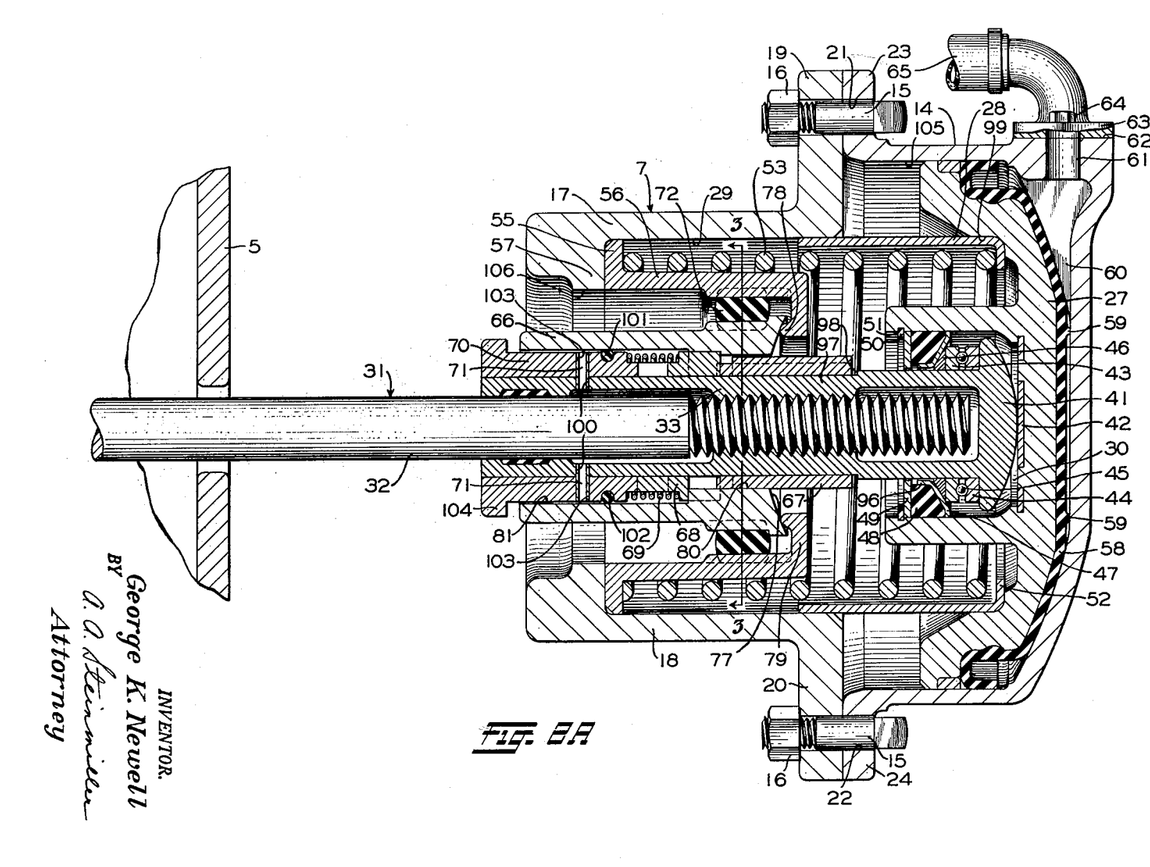

From FIGS. 2A and 4, it will be apparent that the right-hand end of the hollow actuator sleeve 66 is provided with a recessed spherical surface 77 that contacts an annular rib 78 formed on the left-hand side of an inturned flange 79 located at the right-hand end of the spring seat 56. Since the annulus 72 is constructed of a resilient material, such as rubber, as has hereinbefore been stated, the spherical surface 77 may slide or turn on the annular rib 78 to provide limited universal angular movement, or "bailing action," of the piston rod 31 with respect to the longitudinal axis of the brake cylinder 14.

The hollow actuator sleeve 66 is provided with a bore 80 and a coaxial counterbore 81 between the adjacent ends of which is formed, as by machining, a set of internal inwardly extending ratchet teeth 82. The external diameter of the pawl sleeve 68 is slightly less than the internal diameter of the counterbore 81 to provide a sliding fit between the pawl sleeve 68 and the hollow actuator sleeve 66. As shown in FIG. 4, the pawl sleeve 68 is provided on each side thereof with a set of ratchet teeth 83 and 84, respectively. The ratchet teeth 83 have a radial depth equal to one-half the radial depth of the set of ratchet teeth 84. The set of ratchet teeth 84 have twice the radial depth of the set of ratchet teeth 82 formed on the interior of the hollow actuator sleeve 66 so that when the ratchet teeth 84 are in engagement with the ratchet teeth 82, the ratchet teeth 82 cover or contact only the outer one-half of the radial depth of the set of ratchet teeth 84.

The hollow actuator sleeve 66 has a keyway 85 machined in the bore 80 therein, which keyway 85 receives with a sliding fit a spline 86 formed on the exterior of the trigger sleeve 67, the outer diameter of which is such as to have a sliding fit within the bore 80. The trigger sleeve 67 is provided with a set of ratchet teeth 87 on the left-hand end thereof, as indicated in FIG. 4. The radial depth of the set of ratchet teeth 87 is equal to one-half the radial depth of the set of ratchet teeth 84. The inside radius of the set of ratchet teeth 87 is equal to the inside radius of the set of ratchet teeth 84. Consequently, the set of ratchet teeth 87 are adapted to engage the inner half of the set of ratchet teeth 84 or that half of the set of ratchet teeth 84 that is not engaged by the set of ratchet teeth 82. Furthermore, the set of ratchet teeth 87 are arcuately offset from the ratchet teeth 84 of double radial depth on the pawl sleeve 68, as is illustratively indicated by the line a—b shown in FIG. 4.

The trigger sleeve 67 is provided with a bore 88 which is slightly larger than the external diameter of the sleeve member 33 of the piston rod 31 to provide a sliding fit between the trigger sleeve 67 and the sleeve member 33.

As shown in FIG. 4, the right-hand end of the ratchet sleeve 70 is provided with a set of ratchet teeth 89 which has the same inside and outside radius and therefore the same radial thickness as the set of ratchet teeth 83 on the left-hand side of the pawl sleeve 68 with which the set of ratchet teeth 89 is adapted to engage.

To facilitate assembly of the piston 27 within the brake cylinder 14, prior to placing the piston 27 within the cylinder 14, the slack adjuster mechanism and the piston rod 31 are assembled in a manner hereinafter described.

First, the bushing 36 is slipped over the threaded end of the screw member 32 of the piston rod 31 and moved to a position coaxial therewith in which the cavity 37 therein contacts the spherical or ball-like end 34 of screw member 32. Next, the heavy spring 38 is slipped over the threaded end of the screw member 32 and placed in a position in which its left-hand end, as viewed in FIG. 2B, rests against the bushing 36 and encircles an annular rib 90 thereon.

Thereafter, a wrap-around spring clutch 91, the retaining plate 39, a sleeve 92 having an apertured lever arm 93 integral therewith and carrying at its left-hand end a snap ring 94 previously assembled thereto to retain spring clutch 91 therein, and a washer 95 are, in the order named, slipped over the threaded end of the screw member 32 and moved to the position in which they are shown in FIG. 2B, after which the retaining plate 39 is secured to the upper and lower flanges of the brake beam 4 by the cap screws 40.

Next, the thrust bearing comprising the bearing races 43 and 44 and the ball bearing 45 is assembled and slipped on the sleeve member 33 and pushed against the left-hand side of the knob 41 at the right-hand end of the sleeve member 33. Thereafter, the spherical seated washer 46 and the spherical seated member 47 in the order named are slipped onto the sleeve member 33 and placed in a position in which the spherical seated washer 46 abuts the left-hand side of the bearing race 43. Subsequently the cushioning element 48 is likewise slipped onto the sleeve member 33 and placed in a position in which it surrounds a cylindrical end 96 formed on the spherical seat member 47 in surrounding relation to the sleeve member 33 so that the inner wall of the cushioning element is spaced slightly from the outer periphery of the sleeve element. After thus placing the cushioning element 48 in the proper position with respect to the spherical seat member 47, the hollow plate member 49 is slipped onto the sleeve member 33. Following this, the knob 41 of the sleeve member 33 and the above-mentioned parts which have been assembled to the sleeve member 33 are placed within the recess 30 in the piston 27 so that the knob 41 on the sleeve member 33 abuts the wear plate 42. Now the hollow plate member 49 is pressed against the cushioning element 48 until the snap ring 50 can be snapped or inserted into the groove 51 in the piston 27.

After the snap ring 50 has been inserted in the groove 51, the trigger sleeve 67 is slid onto a reduced portion 97 of the sleeve member 33, the diameter of which is slightly less than that surrounded by the bearing races 43 and 44 and forms therewith a shoulder 98. Now the hollow rod 28 is assembled to the piston 27 by being press-fitted into a counterbore 99 formed in the piston 27. After the hollow rod 28 has been press-fitted into the counterbore 99 in the piston 27, the brake cylinder release spring 53 is placed within the hollow rod 28 so that the right-hand end of the spring rests against the inturned flange 52 of the hollow rod 28.

Following the positioning of the release spring 53 within the hollow rod 28, the hollow actuator sleeve 66, to which has been previously assembled a spring seat 56 by means of the annulus 72 which is inserted therebetween and pushed toward the inturned flange 79 until the spherical surface 77 on the hollow actuator sleeve 66 abuts the annular rib 78 on the spring seat 56, is slipped over the sleeve member 33 and rotated to a position in which the keyway 85 therein and spline 86 on the trigger sleeve 67 are in alinement so that thereafter the hollow actuator sleeve 66, together with the annulus 72 and spring seat 56 can be pushed in the direction of the trigger sleeve 67 so that the spline 86 enters the keyway 85, it being understood that the outer diameter of the spring seat 56 is less than the inside diameter of the spring 53 so that the spring seat 56 enters the spring 53.

Now the flange 55 of the spring seat 56 is secured to a fixed member, such as a jig, after which the spring 53 is compressed by the application of force to the piston 27 to move the piston 27 and the sleeve member 33, together with the parts which have been assembled thereon, until the shoulder 98 on sleeve member 33 abuts the right-hand end of the trigger sleeve 67 and thereafter moves the trigger sleeve therewith, to a position in which a plurality of equally spaced and circumferentially arranged bores 100 in the sleeve member 33 are without and to the left-hand side of the left-hand end of the hollow actuator sleeve 66. With the piston 27 held in this position by some suitable means, the pawl sleeve 68 is slipped over the left-hand end of the sleeve member 33 and then pushed into the bore 81 in the actuator sleeve 66 until the set of teeth 84 on the pawl sleeve 68 engages the set of ratchet teeth 82 on the interior of the hollow actuator sleeve 66. Next, the spring 69 is slipped over the left-hand end of the sleeve member 33 and moved toward the pawl sleeve 68 until the right-hand end of the spring 69 encircles the set of ratchet teeth 83 on the left-hand side of the pawl sleeve 68.

Next, an O-ring 101 is assembled to the ratchet sleeve 70 by being pushed over the right-hand end thereof until the O-ring fits into a groove 102 formed on the periphery of the ratchet sleeve. Now the right-hand end of the ratchet sleeve 70 is slipped over the left-hand end of the sleeve member 33 and moved toward the pawl sleeve 68 against the yielding resistance of the spring 69 until the ratchet sleeve 70 is moved to a position in which a plurality of equally spaced and circumferentially arranged bores 103 arranged about the periphery thereof and being equal in number and spacing to the bores 100 in the sleeve member 33 are in alinement with the bores 100. With the ratchet sleeve 70 in this position, a pin 71 is inserted into each of the bores 103 in the ratchet sleeve 70 and the now coaxially disposed bores 100 in the sleeve member 33 so that the plurality of pins 71 rigidly secure the ratchet sleeve 70 to the sleeve member 33.

After securing the ratchet sleeve 70 to the sleeve member 33, the screw-threaded member 32 is screwed into the internal threaded portion of the sleeve member 33 a distance substantially equal to the length of threads on the right-hand end of the screw member 32 to form the piston rod 31.

Next, packing cup 58 of the snap-on type is secured to the pressure face of the piston 27. Now, the piston 27, the piston rod 31 and the other members constituting the assembly just described may be removed from the jig, whereupon the release spring 53 will expand somewhat and move the assembled parts to a position in which the left-hand end of the hollow actuator sleeve 66 abuts a collar 104 formed on the left-hand end of the ratchet sleeve 70.

Subsequent to removing the piston 27 and rod 31 together with the parts assembled thereto from the jig, the packing cup 58 is inserted into a bore 105 in the brake cylinder 14. Thereafter, the packing cup 58, together with the piston 27 and hollow rod 28, is pushed toward the pressure head end of the brake cylinder 14 until the lugs 59 on the packing cup 58 abut the pressure head and prevent further movement of the assembled piston and piston rod.

With the piston 27 thus assembled within the bore 105 of the brake cylinder 14, the piston rod 31 is inserted through an opening or bore 106 formed by the inturned flange 57 on the non-pressure head 7. Then the piston 27 and brake cylinder 14 are placed in a position in which the flange 55 on the left-hand end of the spring seat 56 and also the hollow rod 28 will enter the bore 29 in the non-pressure head 7 as the piston 27 and piston rod 31 are moved in the direction of the left hand as viewed in FIG. 2A. The entire assembly above described is now pushed in the direction of the left hand so that first the flange 55 enters the bore 29 and subsequently the left-hand end of the hollow rod 28 likewise enters the bore 29, after which the piston 27 and brake cylinder 14 are pushed in the direction of the left hand until the bolting flanges 23 and 24 on the brake cylinder 14 abut the corresponding flanges 19 and 20 on the non-pressure head 7, it being understood that in this abutting position the release spring 53 is compressed to a chosen degree.

The brake cylinder 14 is now secured to the pressure head 7 and thereby the brake beam 3 by means of the bolts 15 and nuts 16.

After a brake cylinder 14 has been secured to each of the brake beams 3 and 4 and the exterior end of the corresponding piston rod 31 connected to the other of the two brake beams, as has been described hereinbefore, the washer 95 is pushed into abutting relationship with the right-hand side of the lever 93, as shown in FIG. 2B, after which the washer 95 is retained in this position by inserting a snap ring 107 in a groove 108 formed in the periphery of the screw member 32 of the piston rod 31.

As can be seen from FIG. 2B, the wrap-around spring clutch 91 has at its right-hand end a lateral extension 109 that is disposed in a keyway 110 formed in the lever 93. Therefore, when the lever 93 is pulled toward an observer, as viewed in FIG. 2B, the wrap-around spring clutch 91 will be tightened about the outer periphery of the screw member 32 of the piston rod 31 and, when completely tight, will effect rotation of the screw member 32 relative to the sleeve member 33 to change the length of the piston rod 31.

As can be seen from FIG. 2B, the spherical or ball-like end 34 of the screw member 32 is provided with a hexagonal shaped cavity 111 which is coaxial with a bore 112 formed in the web portion of the brake beam 4. By inserting the hexagonal shaped end of a tool, such as a crank, through the bore 112 and into the hexagonal shaped cavity 111, the screw member 32 of the piston rod 31 can be rotated relative to the sleeve member 33 of the piston rod which might be necessary in case of ice and snow entering the space between the upper and lower flanges of the brake beam 4 and thereafter freezing to prevent rotation of the lever 93.

*Operation*

Let it be supposed that each of the brake cylinder pistons 27 and each of the brake cylinders 14 occupy their respective release positions in which they are shown in FIG. 2A. In this position of each of the brake cylinders 14 and pistons 27, the brake beams 3 and 4 will be in a brake released position in which the brake shoes 12 carried by the respective brake beams are out of braking contact with their corresponding wheels 1 and 2. When the brake beams occupy their release position, the distance from the braking surface of each brake shoe and its corresponding wheel tread is nominally 11/16" whether the brake shoes 12 are of the cast iron type or are of the "composition" type.

When it is desired to effect a brake application, fluid under pressure is admitted simultaneously to the pressure chamber 60 in each of the brake cylinders 14 through the flexible hose 65, which is connected to the brake controlling valve device of the usual air brake system on railway freight cars, flange fitting 63, and passageway 61. Fluid under pressure thus supplied to the chambers 60 formed between the respective piston 27 and the closed end or pressure head of each brake cylinder 14 is effective to move the pistons 27 and cylinders 14 in opposite directions. As the pistons 27 and cylinders 14 are moved in opposite directions, the brake beams 3 and 4 also move in opposite directions since the pistons 27 are each connected to another brake beam through the corresponding piston rod 31 and the cylinders 14 are each carried by one of the brake beams other than the said another brake beam. As the brake beams move in opposite directions, the brake shoes 12 carried by the brake beams are brought into braking contact with the tread surface of the wheels of the truck to effect a braking action on the wheels.

As the brake beams 3 and 4 are moved in opposite directions, as described above, these beams are supported and guided by the guide feet 9 as these feet have sliding contact in corresponding grooves in the wear plate and guide members 10. As hereinbefore mentioned, the orientation of the wear plate and guide members 10 is such that the brake beams 3 and 4 and the brake shoes 12 carried thereby are moved radially toward the wheels.

It should be understood that in view of the symmetrical disposition of the brake cylinders on the one and on the other brake beam on opposite sides of the longitudinal axis of the truck and the corresponding symmetrical relation of the points at which the piston rods are connected to the other brake beam, the simultaneous supply of fluid at the same pressure to the pressure chamber 60 of both brake cylinders 14 produce substantially equalized forces of application of the brake shoes to the wheels.

Referring to FIG. 2A, it will be apparent that when fluid under pressure is supplied to the chamber 60, the piston 27 will move in the direction of the left hand and the brake cylinder 14, together with the brake beam to which it is secured, will move in the direction of the right hand. As the piston 27 moves in the direction of the left hand, the sleeve member 33 will be carried in the direction of the left hand since the knob 41 of sleeve member 33 abuts the wear plate 42. Consequently, the shoulder 98 on the sleeve member 33 moves into contact with the right-hand end of the trigger sleeve 67. Further movement of the piston 27 and sleeve member 33 in the direction of the left hand is effective to move the trigger sleeve 67 in the same direction since the shoulder 98 now abuts the right-hand end of the trigger sleeve 67. As the trigger sleeve 67 is thus moved in the direction of the left hand, as viewed in FIGS. 2A and 4, the set of ratchet teeth 87 on the left-hand end of the trigger sleeve 67, by reason of the fact that they engage the inner half of the radial thickness of the set of teeth 84 on the pawl sleeve 68, effect movement of the pawl sleeve 68 in the direction of the left hand. The pawl sleeve 68 is thus moved in the direction of the left hand along with the trigger sleeve 67, sleeve member 33 and piston 27 until the brake shoes 12 are brought into braking contact with their respective wheels. It will be understood that in the absence of brake shoe wear the outer half of the radial thickness of the set of ratchet teeth 84 on the pawl sleeve 68 is not moved out of clutching engagement with the set of ratchet teeth 82 formed on the interior of the actuator sleeve 66.

In other words, when no brake shoe wear occurs, the trigger sleeve 67 is not moved far enough to move the set of ratchet teeth 84 completely out of engagement with the set of ratchet teeth 82.

When it is desired to release the brake application, fluid under pressure supplied to the chamber 60 of both brake cylinders 14 is vented therefrom in the usual manner to atmosphere through the passageway 61, flange fitting 63, and flexible hose 65 to the brake controlling valve device of the car brake system, whereupon the force of each release spring 53 acting through the outturned flange 55 of the spring seat 56 on the inturned flange 57 of the non-pressure head 7 moves the corresponding brake cylinder 14 and its piston 27 in a brake releasing direction to move the brake beams toward each other and the brake shoes correspondingly away from the tread surface of the wheels of the truck to effect a brake release.

Due to the inclination of the grooves in the wear plate and guide members 10, the brake beams tend to return by action of gravity to their normal symmetrical relation with respect to the truck bolster, in which position the clearance between the brake shoes on one brake beam and their associated wheels is substantially equal to the clearance between the brake shoes on the other brake beam and their associated wheels.

Now let it be supposed that while the brakes are applied, the brake shoes 12 begin to wear away. Consequently, in response to this wear, each brake cylinder 14 and its corresponding piston 27 must move in opposite directions a greater distance than when no wear occurred to insure that the braking surface of the brake shoes remain in contact with the corresponding wheels. This wearing away of the brake shoes 12 and, consequently, increase in the travel of the piston 27, sleeve member 33, and trigger sleeve 67, after the shoulder 98 contacts the right-hand end of the sleeve, as viewed in FIG. 2A, is effective to move the pawl sleeve 68 far enough in the direction of the left hand to move the set of teeth 84 thereon completely out of ratchet engagement with the set of ratchet teeth 82 on the interior of the hollow actuator sleeve 66. As illustrated by the line a—b in FIG. 4, it can be seen that when the trigger sleeve 67 moves the set of ratchet teeth 84 completely out of engagement with the set of ratchet teeth 82 on the interior of the hollow actuator sleeve 66, the apices of the teeth 87 on the trigger sleeve 67 contact the corresponding ratchet teeth 84 at a point slightly below the apices thereof. Since the ratchet teeth 84 on the pawl sleeve 68 are now completely out of clutching engagement with the teeth 82 on the interior of the hollow actuator sleeve 66 and the apices of the ratchet teeth 87 on the trigger sleeve 67 contact the corresponding ratchet teeth 84 at a point below their apices, the force acting on the trigger sleeve 67 as a result of the fluid pressure acting on the piston 27, effects rotation of the pawl sleeve 68 which is biased toward the trigger sleeve 67 by the spring 69, as the non-rotating ratchet teeth 87 on the trigger sleeve 67 slide down the set of ratchet teeth 84 on the pawl sleeve 68 and into full clutching engagement therewith. This rotation of the pawl sleeve 68 is transmitted through the set of ratchet teeth 83 on the left-hand side thereof to the set of ratchet teeth 89 on the right-hand end of the ratchet sleeve 70 with which they are in clutching engagement to effect rotation of the ratchet sleeve 70 along with that of the pawl sleeve 68. Since the ratchet sleeve 70 is rigidly connected to the sleeve member 33 through the pins 71, the rotation of the ratchet sleeve 70 is transmitted through the pins 71 to the sleeve member 33 so that the ratchet sleeve 70, pawl sleeve 68 and sleeve member 33 are all simultaneously rotated by the trigger sleeve 67. Since the spring 38, shown in FIG. 2B, is a very heavy spring, as has hereinbefore been mentioned, this spring, prevents rotation of the screw member 32 simultaneously with the sleeve member 33. Consequently, the sleeve member 33 is rotated with respect to the screw member 32 to increase the length of the piston rod 31 as the brake shoes wear away to compensate for this wear.

When it is desired to release the brake application, fluid under pressure supplied to the chamber 60 of both brake cylinders 14 is vented in the usual manner to atmosphere through the passageway 61, flange fitting 63, and the flexible hose 65 to the brake controlling valve device of the car brake system, whereupon the force of each release spring 53 acting on the non-pressure head 7 through the flange 55 of the spring seat 56 moves the corresponding brake cylinder 14 and its piston 27 in a brake releasing direction to move the brake beams toward each other and the brake shoes correspondingly away from the tread surface to the wheels of the truck to effect a brake release.

As each brake cylinder piston 27 is thus moved to its release position, the corresponding sleeve member 33 is carried therewith. Therefore, as the sleeve 33 moves in the direction of the right hand, as viewed in FIG. 2A, to its release position, the spring 69, which is disposed between the ratchet sleeve 70 that is connected to the sleeve member 33 by the pins 71 and the pawl sleeve 68, is effective to move the set of ratchet teeth 84 on the pawl sleeve 68 into clutching engagement with the set of ratchet teeth 82 on the interior of the hollow actuator sleeve 66 as the trigger sleeve 67 is moved in the direction of the right hand by the ratchet teeth 84, it being understood that the radial depth of the ratchet teeth 84 is equal to the radial depth of the ratchet teeth 87 on the trigger sleeve 67 plus the radial depth of the set of ratchet teeth 82 on the interior of the hollow actuator sleeve 66. After the ratchet teeth 84 are in full clutching engagement with the set of ratchet teeth 82 on the interior of the hollow actuator sleeve 66, no further movement of the trigger sleeve 67 in the direction of the right hand will occur. However, the sleeve member 33 and piston 27 will continue to move in the direction of the right hand until the lugs 59 on packing cup 58 contact the pressure head of the brake cylinder 14. Therefore, the shoulder 98 on the sleeve member 33 is moved away from the right-hand end of the trigger sleeve 67 to the position in which it is shown in FIG. 2A.

Let it be supposed that while the brakes are applied either one of the wheel and axle units associated with the brake beams 3 and 4 shifts laterally in the supporting truck journal boxes due to variance in the distance between the rails on which the car is traveling and/or the shifting weight of the car as a result of action of the centrifugal force created as the car travels around a curve. This lateral shifting of the wheels with respect to the brake shoes would normally result in abnormally high stresses in and undue wear on the wheel flanges as well as uneven wear on the wheel treads thereby reducing the time between wheel turnings and, consequently, the ultimate length of life of the wheels. However, due to the resiliency of the annulus 72 and the cushioning element 48, and also the ball and socket action provided by the spherical ball-like end 34 of the screw member 32 and the cavity 35, both piston rods 31 can move to the right or to the left of their normal position a limited amount to prevent this "bailing action" from producing abnormally high stresses in both the piston rods 21 and the wheel flanges of the wheels 1 and 2.

Furthermore, due to unevenness in the rails, one wheel and axle unit may move up or down with respect to the other as the car travels along the rails. Likewise, this vertical movement of one wheel and axle unit with respect to the other unit causes compression of the resilient annulus 72 and the cushioning element 48 in the same manner as when the wheel and axle units shifted laterally in the supporting truck journal boxes due to variance in the distance between the rails on which the car is traveling and/or the shifting of the weight of the car as a result of the action of the centrifugal force created as the car travels around a curve.

From the above, it is apparent that the resilient annulus 72 and the cushioning element 48, together with the ball and socket action provided by the spherical ball-like end 34 of the screw member 32 and the cavity 35, provide limited universal angular movement or "bailing action" of the respective ends of each of the piston rods 31 with respect to the corresponding brake cylinder piston 27 and also with respect to the other brake beam to prevent abnormally high stresses in the piston rods.

Let it be assumed that one or more brake shoes 12 have worn out and it is desired to replace the worn shoes or shoe with a new shoe. Since the new shoes are thicker than the old shoes that are removed, it is necessary to shorten the piston rod 31 to provide the proper clearance between the brake shoes and the wheels. To effect shortening of the piston rod 31, it is only necessary that a repairman standing beside the car insert the hook end of a hook rod tool into the aperture of the lever 93 and then, as viewed in FIG. 2B, pull the hook rod tool toward him to rock the lever 93. Since the lateral extension 109 of the wrap-around spring clutch 91 is disposed in the keyway 110 in the lever sleeve portion 92, rotation of the lever will tighten the wrap-around spring clutch 91 about the screw member 32 until a firm grip is established therewith, after which continued pulling on the hook rod tool to rock the lever 93 effects rotation of the screw member 32 relative to the sleeve member 33 to shorten the piston rod 31. After the repairman has pulled the lever 93 towards himself, as viewed in FIG. 2B, as far as he can, he will then exert a push on the hook rod tool to rock the lever 93 in the opposite direction. When the repairman exerts a push on the hook rod tool, the lever 93, as viewed in FIG. 2B, will be moved away from him. As the lever 93 is thus rocked away from the repairman, it is apparent from FIG. 2B that the lateral extension 109 is rotated with the lever to loosen or unwrap the wrap-around clutch 91 from the screw member 32 of the piston rod 31. Therefore, after the repairman has shoved the hook rod tool in a direction away from him as far as he can to effect unwrapping of the wrap-around spring clutch 91 from the screw member 32, he will then exert a pull on the hook rod tool to again effect rotation of the screw member 32 relative to the sleeve member 33 in the manner described above. It is evident from what has been said above that the repairman, by alternately pulling and pushing on the hook rod lever repeatedly, is enabled to shorten the piston rod 31 until sufficient clearance is provided to replace the worn out brake shoes with new brake shoes.

Having now described the invention, what I claim as new and desire to secure by Letters Patent, is:

1. Slack adjusting mechanism for railway truck brake rigging of the type in which two substantially parallel brake shoe carrying brake beams are operatively connected by means of brake cylinders carried on the brake beams and by the respective pistons and piston rods of said brake cylinders connected to the brake beam opposite to that carrying the brake cylinder, said slack adjusting mechanism for each brake cylinder comprising the combination of:

(a) a piston rod having two coaxially related members screw-threadedly connected together, one of said members being coaxially connected to its brake cylinder piston by means of a connection enabling limited universal angular movement of said member with respect to the piston, and the other of said members being connected to a corresponding brake beam by means enabling limited universal angular movement of the other of said members with respect to such brake beam,
 (b) an actuator sleeve through which said piston rod extends and being resiliently anchored at one end in coaxial relation to the corresponding brake cylinder so as to have limited universal angular movement with respect thereto, said actuator sleeve having a bore and a coaxial counter bore cooperating to constitute a shoulder therebetween on which a set of ratchet teeth of a chosen radial thickness is formed,
 (c) a trigger sleeve slidably mounted on said one member of said piston rod for longitudinal movement thereby through said bore and splined to said hollow actuator sleeve for rotation together therewith, said trigger sleeve having adjacent one end thereof a set of ratchet teeth of said chosen radial thickness the apices thereof being accurately offset from the apices of said set of internally extending ratchet teeth,
 (d) a pawl sleeve slidably mounted on said one member of said piston rod and within said actuator sleeve, said pawl sleeve having on each side thereof a set of ratchet teeth, the set of ratchet teeth on the side thereof adjacent said trigger sleeve having a radial thickness at least twice that of said chosen radial thickness thereby enabling said set of ratchet teeth to at one time fully engage said set of internally extending ratchet teeth on the interior of said actuator sleeve and at another time to be moved out of engagement therewith by movement of said trigger sleeve by said one member of said piston rod in response to excessive travel thereof and its corresponding piston as a result of excessive brake shoe wear, said pawl sleeve being rotatable by said trigger sleeve subsequent to disengagement from said set of internally extending ratchet teeth on the interior of said actuator sleeve, and
 (e) ratchet means connecting the second set of ratchet teeth on said pawl sleeve to said one member of said one piston rod whereby rotation of said pawl sleeve effects rotation of said member with respect to the other member of said one piston rod through said screw-threaded connection therebetween to lengthen said piston rod as brake shoe wear occurs.

2. A brake rigging for a four-wheel type of railway vehicle truck having a transverse axis and a longitudinal axis perpendicular thereto, which brake rigging comprises the combination of:

(a) two brake beams extending in spaced substantially parallel relation to the transverse axis of the car truck, and guidably supported at the ends thereof on the truck for bodily movement longitudinally of the truck,
 (b) a pair of brake cylinders each having a brake cylinder casing secured to one of said brake beams on opposite sides of and in symmetrically spaced relation to the longitudinal axis of the truck along the length of said one brake beam,
 (c) a piston operable in each of said brake cylinder casings,
 (d) a piston rod comprising two members having a screw-threaded connection therebetween,
 (e) means connecting one of said members to its corresponding piston so as to have limited universal angular movement with respect thereto,
 (f) means connecting the other of said members to the other of said brake beams so as to have limited universal angular movement with respect to said other brake beam, and
 (g) slack adjusting means for each brake cylinder, each operative to rotate said one of said members of the corresponding piston rod relative to the other of said members thereby to vary the length of said piston rod to compensate for slack variation, said slack adjusting means comprising an actuator sleeve member through which the said piston rod extends and which has a universal swivel connection with said brake cylinder for angular adjustment of said sleeve member with respect to the brake cylinder in accordance with bailing action of the piston rod.

3. A brake rigging for a four-wheel type of railway vehicle truck having a transverse axis and a longitudinal axis perpendicular thereto, which brake rigging comprises the combination of:

(a) two brake beams extending in spaced substantial parallel relation to the transverse axis of the car truck, and guidably supported at the ends thereof on the truck for bodily movement longitudinally of the truck,
 (b) a pair of brake cylinders each having a brake cylinder casing secured to one of said brake beams on opposite sides of and in symmetrically spaced relation to the longitudinal axis of the truck along the length of said one brake beam, (c) a piston operable in each of said brake cylinder casings, (d) a piston rod comprising two members having a screw-threaded connection therebetween, (e) means connecting one of said members to its corresponding piston so as to have limited universal angular movement with respect thereto, (f) means connecting the other of said members to the other of said brake beams so as to have limited universal angular movement with respect to said other brake beam, and (g) single-acting slack adjusting means for each brake cylinder, each operative to rotate said one of the corresponding piston rod members relative to the other of said members thereby to increase the length of said piston rod to compensate for an increase in slack, said slack adjusting means comprising an actuator sleeve member through which the said piston rod extends and which has a universal swivel connection with the corresponding said brake cylinder for angular adjustment of said sleeve member with respect thereto in accordance with bailing action of the piston rod.

4. A brake rigging for a four-wheel type of railway vehicle truck having a transverse axis and a longitudinal axis perpendicular thereto which brake rigging comprises the combination of:

(a) two brake beams extending in spaced substantial parallel relation to the transverse axis of the car truck, and guidably supported at the ends thereof on the truck for bodily movement longitudinally of the truck, (b) a pair of brake cylinders each having a brake cylinder casing secured to one of said brake beams on opposite sides of and in symmetrically spaced relation to the longitudinal axis of the truck along the length of said one brake beam, (c) a piston operable in each of said brake cylinder casings, (d) a piston rod comprising two members having a screw-threaded connection therebetween, (e) means connecting one of said members to its corresponding piston so as to have limited universal angular movement with respect thereto, (f) means connecting the other of said members to the other of said brake beams so as to have limited universal angular movement with respect to said other brake beam, and (g) a manually operative slack adjusting mechanism connected to the other of said members of said piston rod at the end thereof exterior of said corresponding brake cylinder casing and operative to rotate said other member of said piston rod relative to said one member of said piston rod thereby to decrease the length of said piston rod to provide proper clearance for the installation of brake shoes, said manually operative slack adjusting means comprising a lever having an aperture through which said other member of said piston rod extends, and a helical spring clutch member disposed between said lever and said other of said piston rod members and having one end thereof anchored to said lever and the other end anchored to said other piston rod member, whereby rocking of said lever in one direction tightens said spring clutch member about said other member of said piston rod to effect rotation thereof with respect to said one member to decrease the length of said piston rod, and rocking of said lever in an opposite direction releases said spring clutch member from said other member so that rotation of said other member with respect to said one member does not occur as said lever rocks in said opposite direction.

5. A brake rigging, as defined in claim 3, for a four-wheel type of railway vehicle truck having a transverse axis and a longitudinal axis perpendicular thereto, further characterized by a slack adjusting mechanism connected to the other of said members of said piston rod for manual operation to effect rotation of said other member of said piston rod with respect to said one member of said piston rod to vary the length of said piston rod.

6. Slack adjusting mechanism for railway truck brake rigging of the type in which two substantially parallel brake shoe carrying brake beams are operatively connected by means of brake cylinders carried on the brake beams and by the respective pistons and piston rods of said brake cylinders connected to the brake beam opposite to that carrying the brake cylinder, said slack adjusting mechanism for each brake cylinder comprising the combination of:

(a) a piston rod having two coaxially related members screw-threadedly connected together, one of said members being coaxially connected to its brake cylinder piston by means of a connection enabling limited universal angular movement of said member with respect to the piston, and the other of said members being connected to a corresponding brake beam by means enabling limited universal angular movement of the other of said members with respect to such brake beam, (b) an actuator sleeve through which said piston rod extends and being movably connected at one end in coaxial relation to the corresponding brake cylinder so as to have limited universal angular movement with respect thereto, said actuator sleeve having a bore and a coaxial counter bore cooperating to constitute a shoulder therebetween on which a set of ratchet teeth of a chosen radial thickness is formed, (c) a trigger sleeve slidably mounted on said one member of said piston rod for longitudinal movement thereby through said bore and splined to said hollow actuator sleeve for rotation therewith, said trigger sleeve having adjacent one end thereof a set of ratchet teeth of said chosen radial thickness the apices being arcuately offset from the apices of said set of internally extending ratchet teeth, (d) a pawl sleeve slidably mounted on said one member of said piston rod and within said actuator sleeve, said pawl sleeve having on each side thereof a set of ratchet teeth, the set of ratchet teeth on the side thereof adjacent said trigger sleeve having a radial thickness at least twice that of said chosen radial thickness thereby enabling said set of ratchet teeth to at one time fully engage said set of internally extending ratchet teeth on the interior of said actuator sleeve and at another time to be moved out of engagement therewith by movement of said trigger sleeve by said one member of said piston rod in response to excessive travel thereof and its corresponding piston as a result of excessive brake shoe wear, said pawl sleeve being rotatable by said trigger sleeve subsequent to disengagement from said set of internally extending ratchet teeth on the interior of said actuator sleeve, (e) ratchet means connecting the second set of ratchet teeth on said pawl sleeve to said one member of said piston rod whereby rotation of said pawl sleeve effects rotation of said member with respect to the other member of said one piston rod through said screw-threaded connection therebetween to lengthen said piston rod as brake shoe wear occurs, and (f) additional slack adjusting mechanism for each brake cylinder comprising:

(I) an apertured lever through which said other member of said piston rod extends, and (II) a helical spring clutch member disposed between said lever and said other member having one end thereof anchored to said lever and the other end anchored to said other member, whereby manual rocking of the said lever in one direction tightens said spring clutch about said other member to effect rotation thereof with respect to said one member to decrease the length of said piston rod, and rocking of said lever in an opposite direction releases said spring clutch member from said other member so that rotation of said other member with respect to said one member does not occur as said lever rocks in said opposite direction.

7. A slack adjusting mechanism for a railway car brake cylinder of the type having a casing, a piston and a piston rod secured to the piston, said slack adjusting mechanism comprising the combination of:
  (a) a brake cylinder piston rod comprising two members having a screw-threaded connection therebetween,
  (b) means connecting one of said members to the piston of the brake cylinder for rotation with respect thereto and so as to have limited universal angular movement with respect thereto, and
  (c) means operative to rotate said one of said members of the brake cylinder piston rod relative to the other of said members thereby to vary the length of said piston rod to compensate for slack variation, said means comprising a sleeve member through which the said piston rod extends and which has a universal swivel connection with said brake cylinder for angular adjustment of said sleeve member with respect to the brake cylinder in accordance with bailing action of the piston rod.

8. A slack adjusting mechanism for a railway car brake cylinder of the type having a casing, a piston and a piston rod secured to the piston, said slack adjusting mechanism comprising the combination of:
  (a) a brake cylinder piston rod comprising two members having a screw-threaded connection therebetween,
  (b) means connecting one of said members to the piston of the brake cylinder for rotation with respect thereto and so as to have limited universal angular movement with respect thereto, and
  (c) means operative to rotate said one member of the brake cylinder piston rod relative to the other of said members thereby to vary the length of said piston rod to compensate for slack variation, said means comprising:
    (I) a sleeve member through which the said piston rod extends and which has a universal swivel connection with said brake cylinder for angular adjustment of said sleeve member with respect to the brake cylinder in accordance with bailing action of the piston rod,
    (II) a first element carried by and rotatable with said one member of the piston rod and having means cooperating with said sleeve member to lock said one member of the piston rod against rotation relative to said sleeve,
    (III) A second element carried by and movable with said piston rod and effective upon linear movement of said piston rod in a brake applying direction more than a certain distance to unlock said first element from said sleeve, and
    (IV) cooperating means partly on said first element and partly on said second element for translating linear movement of said second element into rotary motion of said first element, thereby to effect rotation of said one member of said piston rod relative to the other member for slack take-up.

9. A slack adjusting mechanism for a railway car brake cylinder of the type having a casing, a piston and a piston rod secured to the piston, said slack adjusting mechanism comprising the combination of:
  (a) a brake cylinder piston rod comprising two members having a screw-threaded connection therebetween,
  (b) means connecting one of said members to the piston of the brake cylinder for rotation with respect thereto and so as to have limited universal angular movement with respect thereto, and
  (c) means operative to rotate said one member of the brake cylinder piston rod relative to the other of said members thereby to vary the length of said piston rod to compensate for slack variation, said means comprising:
    (I) a sleeve member through which said piston rod extends, said sleeve member having a bore and a coaxial counterbore cooperating to constitute a shoulder therebetween on which ratchet teeth of a chosen radial thickness are formed,
    (II) a pawl sleeve mounted within the counterbore of said sleeve member and operatively connected to said one member of said piston rod, one end of said pawl sleeve having ratchet teeth thereon of a radial thickness greater than that of said chosen thickness of the ratchet teeth on said sleeve member, said ratchet teeth of said pawl sleeve normally engaging said ratchet teeth on said sleeve member, and
    (III) trigger means carried by said brake cylinder piston rod in non-rotatable and axially slidable relation to said sleeve member and having on one end thereof ratchet teeth the outer diameter of which is greater than the inner diameter of the ratchet teeth on said pawl sleeve, said ratchet teeth on the trigger sleeve means being also offset circumferentially with respect to the ratchet teeth on said sleeve member so as to be effective upon the travel of said brake cylinder piston rod in a brake applying direction exceeding a certain amount to engage the ratchet teeth of said pawl sleeve to effect disengagement thereof from the ratchet teeth of said sleeve member and rotation of said pawl sleeve and said one member of said brake cylinder piston rod relative to the other of said members thereby to vary the length of said brake cylinder piston rod to compensate for slack variation.

10. A slack adjusting mechanism for a railway car brake cylinder comprising the combination of:
  (a) a brake cylinder piston rod having two coaxially related members screw-threadedly connected together, one of said members being coaxially connected to a brake cylinder piston, and the other of said members being connected to a brake rigging,
  (b) an actuator sleeve through which said piston rod extends and being anchored at one end in coaxial relation to the corresponding brake cylinder, said actuator sleeve having a bore and a counterbore cooperating to constitute a shoulder therebetween on which a set of ratchet teeth of a chosen radial thickness is formed,
  (c) a trigger sleeve slidably mounted on said one member of said piston rod for longitudinal movement thereby through said bore and splined to said hollow actuator sleeve, said trigger sleeve having adjacent one end thereof a set of ratchet teeth of said chosen radial thickness, the apices thereof being arcuately offset from the apices of said set of internally extending ratchet teeth,
  (d) a pawl sleeve slidably mounted on said one member of said piston rod and within said actuator sleeve, said pawl sleeve having on each side thereof a set of ratchet teeth, the set of ratchet teeth on the side thereof adjacent said trigger sleeve having a radial thickness greater than that of said chosen radial thickness thereby enabling said set of ratchet teeth to at one time fully engage said set of internally extending ratchet teeth on the interior of said actuator sleeve and at another time to be moved out of engagement therewith by movement of said trigger sleeve by said one member of said piston rod in response to excessive travel thereof and its corresponding piston as a result of excessive brake shoe wear, said pawl sleeve being rotatable by said trigger sleeve upon disengagement from said set of internally extending ratchet teeth on the interior of said actuator sleeve, and (e) means operatively connecting said pawl sleeve to said one member of said piston rod whereby rotation of said pawl sleeve effects rotation of said one member with respect to the other member of said piston rod through said screw-threaded connection therebetween to lengthen said piston rod as brake shoe wear occurs.

References Cited in the file of this patent

UNITED STATES PATENTS

| | | |
|---|---|---|
| 728,443 | Clark | May 19, 1903 |
| 1,446,702 | Hiscutt | Feb. 27, 1923 |
| 2,958,398 | Newell | Nov. 1, 1960 |